(No Model.) 2 Sheets—Sheet 1.
A. H. & A. QUAIN & G. P. WARNER.
HIGH GRADE WATER POWER UTILIZER.
No. 437,511. Patented Sept. 30, 1890.
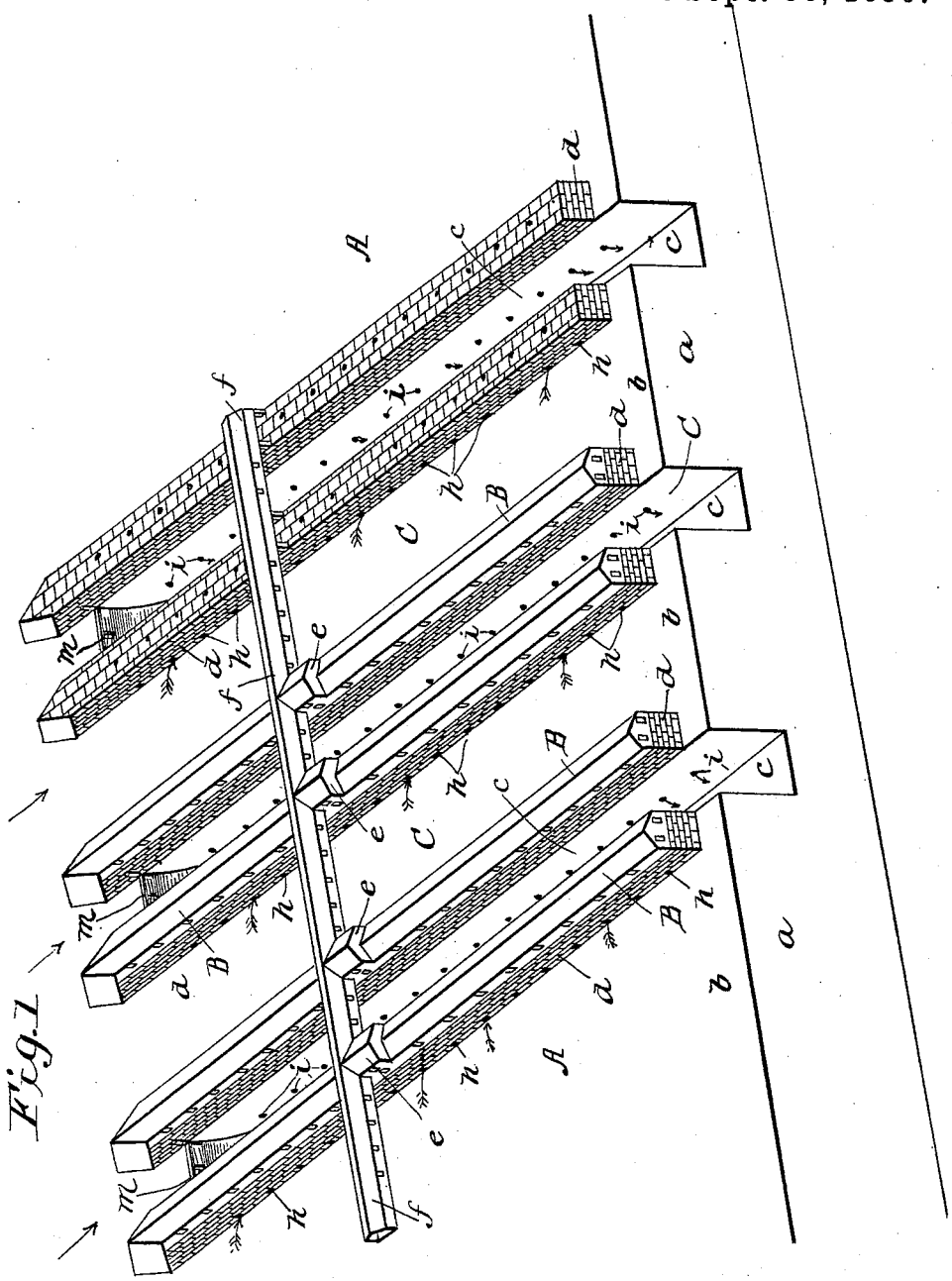

(No Model.) 2 Sheets—Sheet 2.
A. H. & A. QUAIN & G. P. WARNER.
HIGH GRADE WATER POWER UTILIZER.
No. 437,511. Patented Sept. 30, 1890.
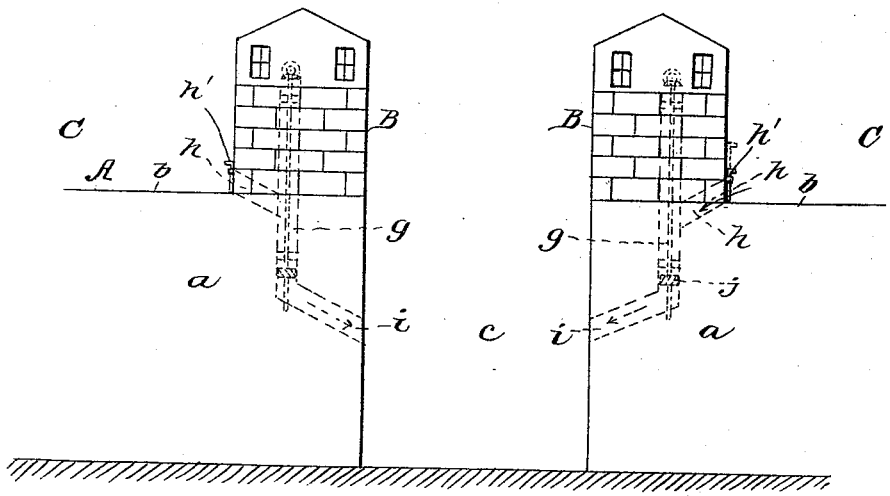
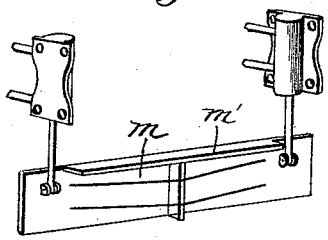
WITNESSES:
Fred G. Dieterich
M. D. Blondel
INVENTOR:
A. H. Quain
A. Quain
G. P. Warner
BY Munn & Co
ATTORNEYS

UNITED STATES PATENT OFFICE.

ALEXANDER H. QUAIN, ALLIE QUAIN, AND GEORGE P. WARNER, OF ALBANY, OREGON.

HIGH-GRADE-WATER-POWER UTILIZER.

SPECIFICATION forming part of Letters Patent No. 437,511, dated September 30, 1890.

Application filed April 5, 1890. Serial No. 346,787. (No model.)

*To all whom it may concern:*

Be it known that we, ALEXANDER H. QUAIN, ALLIE QUAIN, and GEORGE P. WARNER, residing in Albany, in the county of Linn and State of Oregon, have invented a certain new and useful High-Grade-Water-Power Utilizer, of which the following is a specification.

The object of our invention is to develop and use the power contained in falls of rivers and other water-courses where said falls are of such height as to allow of the application of said invention.

To this end our invention consists in the peculiar arrangement and novel combination of the several parts, all of which will hereinafter be fully described in the annexed specification, and particularly pointed out in the claims, reference being had to the accompanying drawings, in which—

Figure 1 is a perspective view of our improvement, showing the face of the falls, three cuts, the walls, and the power-houses thereon. Fig. 2 is an end elevation of one of the cuts and the adjacent walls and power-houses, and Fig. 3 is a detail view of one of the trussed gates, hereinafter referred to.

In the accompanying drawings, A indicates the river-bed, and $a$ the face of the falls. $c\,c\,c$ indicate a series of cuts communicating with the falls and extending up the river-bed $b\,b$, as shown, to each side of which are built the masonry walls $d\,d\,d$, which extend up to a distance normally above the water-line, and upon these walls are built the power-houses B B.

The cuts $c\,c$ extend nearly to the upper end of the power-houses and walls B $d$, the ends of which are formed of trussed gates $m\,m$, working in suitably-arranged guideways formed in the walls $d\,d$, and to render the movement of such gates easy we provide friction-rollers in said guideways, against which the edges of said gates rest.

Any suitable means may be provided for raising said gates $m$; but we prefer to employ hydraulic rams, as shown in Fig. 3.

By reference to Fig. 1 it will be seen that the space between the adjacent faces of the two walls intermediate the cuts $c\,c$ will serve as canals or flumes C to supply the water to the turbines located in the power-houses.

The penstocks $g$ are made by boring holes in the bed of the river and continuing said holes up through the walls at such a distance from the cuts $c\,c$ as to leave a strong wall outside. A number of these penstocks are provided, as will be seen at the right-hand portion of Fig. 1, and with each one of same communicates an inlet $h$ from the flumes C at a point some distance above the turbines $j$, located therein, (see Fig. 2,) and an outlet $i$, which discharges the water from the turbines into the cut or tail-race $c\,c$, as shown.

The turbines $j$ may be of any well-known construction and held within the penstocks in any well-known manner.

Each of the inlet-openings $h$ is formed with a cut-off gate $h'$, whereby the supply to any one or all of the turbines may be cut off when desired.

The trussed gate shown in Fig. 3 is made of iron, sufficiently trussed to withstand the pressure, and with an iron flange $m'$ projecting over the top of a width sufficient to protect the truss-rods from injury from any floating material coming down the stream, said gates being provided to regulate the depth of the water in the cuts $c\,c$.

$e\,e\,e$ indicate covered stairways formed on the power-houses, and $f\,f$ is a covered bridge intended as a means of communication between the several power-houses and also to carry the power from the walls to the shore, and for safety said bridge is built on the top of the power-houses, so as to be above any obstruction that may come down the stream.

O O O indicate ice-breakers formed at the upper end of the walls $d\,d$ and are cased in iron.

From the foregoing description, taken in connection with the drawings, the advantages and operation of our invention will be readily understood.

While we have shown our invention as applied in the bed of rivers, it is manifest that the same may be located on the banks of the river below the falls by forming an artificial canal and bed with the flumes and tail-races connecting said canal and river.

Having thus described our invention, what we claim, and desire to secure by Letters Patent, is—

1. In a high-grade-water-power utilizer, the cuts $c\ c\ c$, made in the bed of the river, and the bed of the river serving as canals or flumes, in combination with the walls $d\ d\ d$, built at the edges of the said cuts $c\ c\ c$, and the penstocks constructed in said walls, substantially as shown and described.

2. In a high-grade-water-power utilizer, the cuts $c\ c\ c$, made in the bed or banks of the river, in combination with the river-bed, said bed serving as canals or flumes, the walls $d\ d\ d$, built at the edges of the cuts $c\ c$, penstocks constructed in said place, and the gates $m$ at the upper ends of the cuts for the purpose of regulating the depth of water in the cuts and canals, substantially as and for the purpose specified.

3. In high-grade-water-power utilizers, the cuts $c\ c\ c$, made in the bed or banks of the river, in combination with the bed of the river serving as canals or flumes, the walls $d\ d$, built at the edges of the cuts, the penstocks constructed in said place, the gates $m\ m\ m$ at the upper ends of the cuts for the purpose of regulating the depth of the water in the cuts or canals, and the cut-off gates at the inlets of the penstocks, substantially as and for the purpose set forth.

4. A high-grade-water-power utilizer comprising cuts $c\ c\ c$, formed in the river-bed, walls formed at the edges of said cuts and extended above the normal water-line, whereby flumes or channels are formed between the said cuts $c\ c\ c$, penstocks formed in said walls and river-bed, turbines located therein, inlets communicating with said penstocks and the flumes, and the outlets connecting said penstocks with the cuts $c\ c$, substantially as and for the purpose described.

5. A high-grade-water-power-utilizing system comprising cuts $c\ c\ c$, formed in the river-bed, walls $d\ d$, located at each side of said cuts and extended above the normal water-line, power-houses located thereon and communicating with each other by the bridges $f\ f$, penstocks formed in said walls and river-bed, turbines mounted therein, inlets opening from the regular water-course into the penstocks above the turbines, and outlets formed in said penstocks below the turbines, opening into the cuts $c\ c\ c$, all arranged substantially as and for the purpose described.

ALEXANDER H. QUAIN.
ALLIE QUAIN.
GEORGE P. WARNER.

Witnesses:
LEROY W. DEYOE,
WILLIAM H. WARNER.